(12) United States Patent
He et al.

(10) Patent No.: US 9,106,963 B2
(45) Date of Patent: Aug. 11, 2015

(54) PLAYER-SIDE CACHE

(71) Applicants: Kevin Kaichuan He, San Jose, CA (US); Semen Kozlov, Burlingame, CA (US)

(72) Inventors: Kevin Kaichuan He, San Jose, CA (US); Semen Kozlov, Burlingame, CA (US)

(73) Assignee: Roblox Corporation, San Mateo, CA (US)

( * ) Notice: Subject to any disclaimer, the term of this patent is extended or adjusted under 35 U.S.C. 154(b) by 166 days.

(21) Appl. No.: 13/753,915

(22) Filed: Jan. 30, 2013

(65) Prior Publication Data

US 2014/0213369 A1   Jul. 31, 2014

(51) Int. Cl.
| | | |
|---|---|---|
| G06F 17/30 | (2006.01) |
| H04N 21/478 | (2011.01) |
| A63F 13/00 | (2014.01) |
| H04N 21/258 | (2011.01) |
| H04L 29/08 | (2006.01) |
| H04L 29/06 | (2006.01) |
| A63F 13/352 | (2014.01) |
| A63F 13/77 | (2014.01) |

(52) U.S. Cl.
CPC ............ *H04N 21/4781* (2013.01); *A63F 13/00* (2013.01); *A63F 13/352* (2014.09); *A63F 13/77* (2014.09); *H04L 67/142* (2013.01); *H04L 67/34* (2013.01); *H04L 67/38* (2013.01); *H04N 21/25858* (2013.01)

(58) Field of Classification Search
CPC .................. A63F 2300/406; A63F 2300/5533; A63F 2300/636; A63F 2300/513; A63F 2300/5546; A63F 2300/407; A63F 2300/401; A63F 2300/50; A63F 2300/532; A63F 13/12; H04N 21/4781; G06F 21/10
USPC .......................................................... 726/33
See application file for complete search history.

(56) References Cited

U.S. PATENT DOCUMENTS

| | | | |
|---|---|---|---|
| 8,584,114 B2 * | 11/2013 | Rabinovich et al. .......... 717/171 |
| 2006/0136964 A1 * | 6/2006 | Diez et al. ........................ 725/37 |
| 2007/0300311 A1 * | 12/2007 | Hirano et al. .................... 726/33 |
| 2010/0121719 A1 * | 5/2010 | Blair et al. .................. 705/14.64 |
| 2010/0137053 A1 * | 6/2010 | Blair et al. ....................... 463/17 |
| 2013/0053150 A1 * | 2/2013 | Miller et al. ..................... 463/42 |

\* cited by examiner

*Primary Examiner* — Jay Liddle
*Assistant Examiner* — Alex F. R. P. Rada, II
(74) *Attorney, Agent, or Firm* — Donald R. Boys; Central Coast Patent Agency, Inc.

(57) ABSTRACT

A method includes steps of opening a link between a player's appliance and a network-connected server providing games, selecting a game to play by the player through an interface provided to the player's appliance by the server, transmitting virtual world data by the server to the player's appliance, along with a version identification, storing the virtual world data and associated version identification in a cache at the player's appliance, playing the game by the player using the player's appliance, and suspending play of the game by the player.

10 Claims, 3 Drawing Sheets

PLAYER-SIDE CACHE

BACKGROUND OF THE INVENTION

1. Field of the Invention

This invention is in the technical area of virtual environments, and pertains in particular to video games

2. Description of Related Art

Video games are notoriously well-known in the art. In some instances games are accessed by players over a network, such as the Internet network, remotely from a central server, and data for a player to play a game is necessarily streamed from the server to the player's computerized appliance, such as a desktop computer, or a mobile device.

In perhaps most instances of such games there is a virtual environment comprising landscape elements, buildings, vegetation, water elements and the like, which involves a great deal of data that must be provided to the player's computer for the player's computer to be able to display the virtual environment necessary to the game. In rather sophisticated games the data is extensive, and there may be a significant time delay from a player choosing to play a game, and the player's computer having all of the necessary data to do so. Further, there is a cost component in the transmission of such large blocks of data.

The cost and time delay involved is a problem to enterprises that provide virtual environments and games for remote players. Any improvement in the time and cost is desirable to these enterprises.

BRIEF SUMMARY OF THE INVENTION

In one embodiment of the present invention a method is provided, comprising opening a link between a player's appliance and a network-connected server providing games, selecting a game to play by the player through an interface provided to the player's appliance by the server, transmitting virtual world data by the server to the player's appliance, along with a version identification, storing the virtual world data and associated version identification in a cache at the player's appliance, playing the game by the player using the player's appliance, and suspending play of the game by the player.

In one embodiment the method further comprises updating the cached data and version identification for any changes made to the virtual world data during play at the point that play is suspended. Also in one embodiment the method comprises providing a version identification to the server by the player's appliance when the player selects the game to play, the version identification identifying a version for which data is stored in the cache, determining by the server if the current version at the server is different than the version identified, determining the difference by the server between the cached version and the current version, if any, and transmitting only the determined difference to the player's cache along with a new version identification.

In one embodiment the method comprises determining by the server at the time a game is selected whether the game is being selected for the first time by the player, determining by the server at the time the game is selected whether the game is a game for which the virtual world is always static, and transmitting a file to the player's appliance, the file comprising all of the virtual world data for the game. In one embodiment the file is transmitted by an indirect path through a third-party provider. In some embodiments the player's appliance may be redirected to a third-party provider for download of data for the game selected.

In another aspect of the invention an apparatus is provided, comprising a network-connected server providing games and software executing on a processor at the server from a non-transitory medium, the software providing: opening a link between the server and a player's appliance, configuring the player's appliance to operate with a cache for storing virtual world data and a version identification for the data, enabling the player to select a game to play through an interface provided to the player's appliance by the server, transmitting the virtual world data for the selected game by the server to the player's appliance, along with the version identification, and storing the virtual world data and associated version identification in the cache at the player's appliance, enabling the player to play the selected game.

In one embodiment the apparatus further updates the cached data and version identification for any changes made to the virtual world data during play at the point that play is suspended.

Also in one embodiment the provides a version identification to the server by the player's appliance when the player selects the game to play, the version identification identifying a version for which data is stored in the cache, determines by the server if the current version at the server is different than the version identified, determines the difference by the server between the cached version and the current version, if any, and transmits only the determined difference to the player's cache along with a new version identification.

In some embodiments the apparatus further determines by the server at the time a game is selected whether the game is being selected for the first time by the player, determines by the server at the time the game is selected whether the game is a game for which the virtual world is always static, and transmits a file to the player's appliance, the file comprising all of the virtual world data for the game. The file may be transmitted directly or through a third-party provider. In some embodiments the file is transmitted by an indirect path through a third-party provider. The player's appliance may be redirected to a third-party provider for download of data for the game selected.

DETAILED DESCRIPTION OF THE INVENTION

In embodiments of the present invention, the inventors provide a system and methods for managing provision of data to player's computerized appliances remotely connected to a server over a network, the data for providing for display of a virtual environment useful by player's appliances for enabling users of the appliances to engage in one or more games provided by the server. The present invention is described in enabling detail using the following illustrated examples, which may include more than one embodiment of the present invention.

Figure 1:
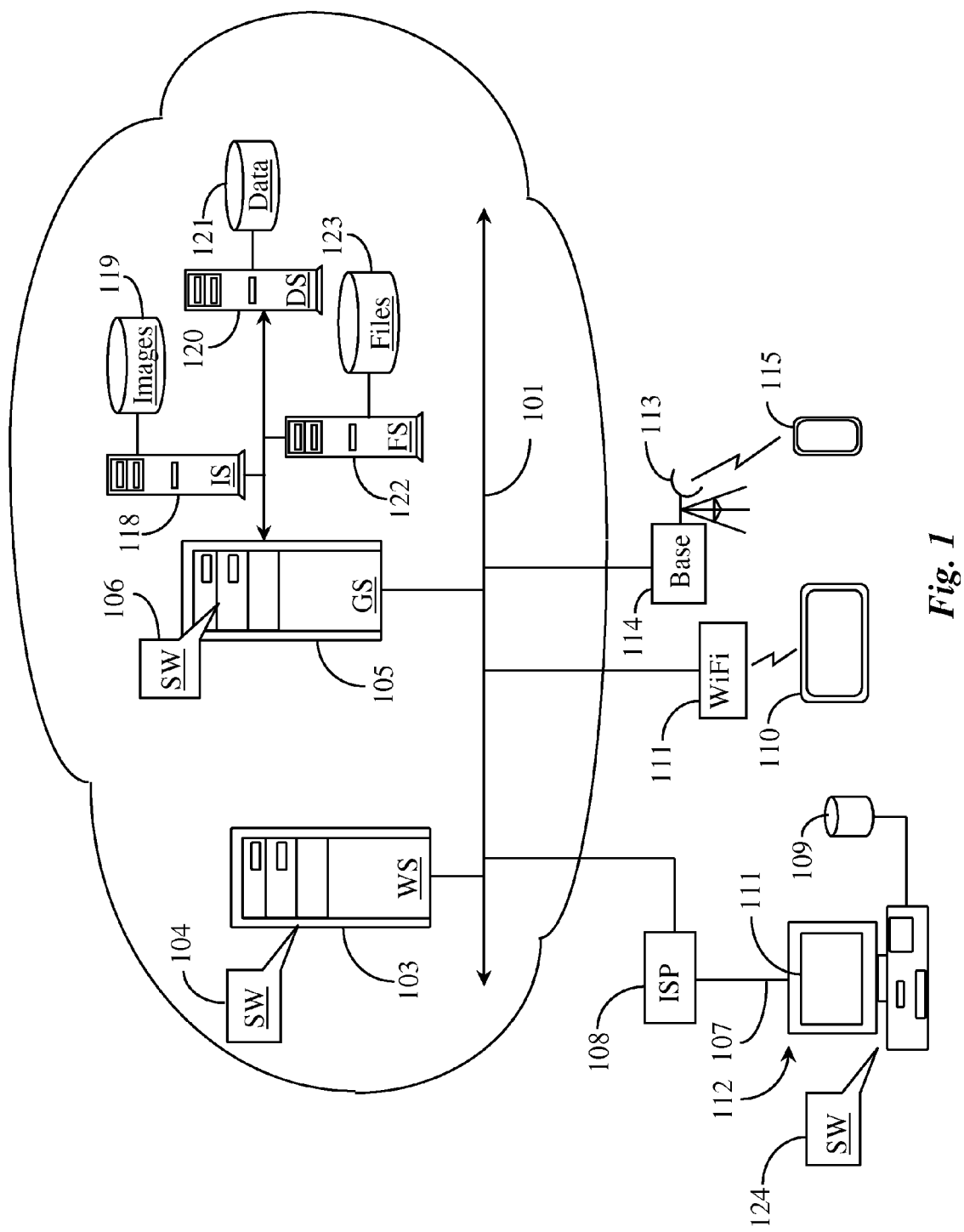
FIG. 1 is an architecture diagram depicting network-connected elements in an embodiment of the present invention.

FIG. 1 is an architectural diagram illustrating a system enabling individuals to play games served from a remote server according to an embodiment of the present invention.

Network 100 in an embodiments of the invention is the well-known Internet network, network backbone 101 represents all of the lines, equipment, and access points that make up the Internet network as a whole. Therefore, there are no geographic limitations to the practice of the present invention. Network 100 may include the Internet network and any connected sub-networks including telephone carriers that may provide access to network 100.

In this example a web server 103 is hosted by a game provider, and manages game provision, management of user accounts, membership maintenance, communication among members, and much more, acting as a service access point for clients of the game service. Functionality of server 103 is through execution of software (SW) 104.

Clients operating a variety of Internet-enabled computerized appliances are represented by desktop computer 112, a pad device 110 and a smart-phone 115. Computer 112 is connected to Internet backbone 101 through an Internet service provider (ISP) 108, has a display 111, and a storage drive 109. Pad device 110 has internal memory, not shown, and connects to the Internet network by a WiFi station 111. Smart-phone 115 connects through a cellular network through an antenna 113 and a base station 114. These devices and their connection to the Internet are meant to represent all of many sorts of devices upon which a client may play games remotely served, and all of many ways in which devices may connect to the Internet network.

In this example management and services may be provided by server 103 hosted by the game provider, but games may actually be stored, maintained and data streamed by a game server 105, executing software 106, with access to an image server 118 having an image storage 119, a data server 120 having a data storage 121, and a file server 122 having file storage 123.

In practice clients using appliance 112, 110 or 115, or like appliances connected to the Internet network, may navigate to web server 103 and be presented with web pages as interactive interfaces, by which the clients may manage their accounts, access services of various sorts, and browse through and select individual ones of a plurality of games to play. Upon selection of a game to play the computerized appliance the client is using must either have in local storage a considerable block of data by which the client's computerized appliance may render the game on a display of his or her computerized appliance, or the necessary data must be provided to the client's apparatus. As described above in the background section, this can be both time-consuming and relatively expensive.

In embodiments of the present invention player's appliances 112, 110 or 115, or other appliances appropriate to display and operate for a player to play a game provided by or through server 103, may at some point in interaction with server 103 be configured to operate in cooperation with server 103 in game provision and interaction. In some embodiments such configuration may include software code downloaded from server 103 and installed on the player's appliance, the code enabling the appliance to cooperate in special ways with the server in provision and playing of games. Such code is represented in FIG. 1 by SW 124. Functionality of SW 124 is described further below.

Figure 2:
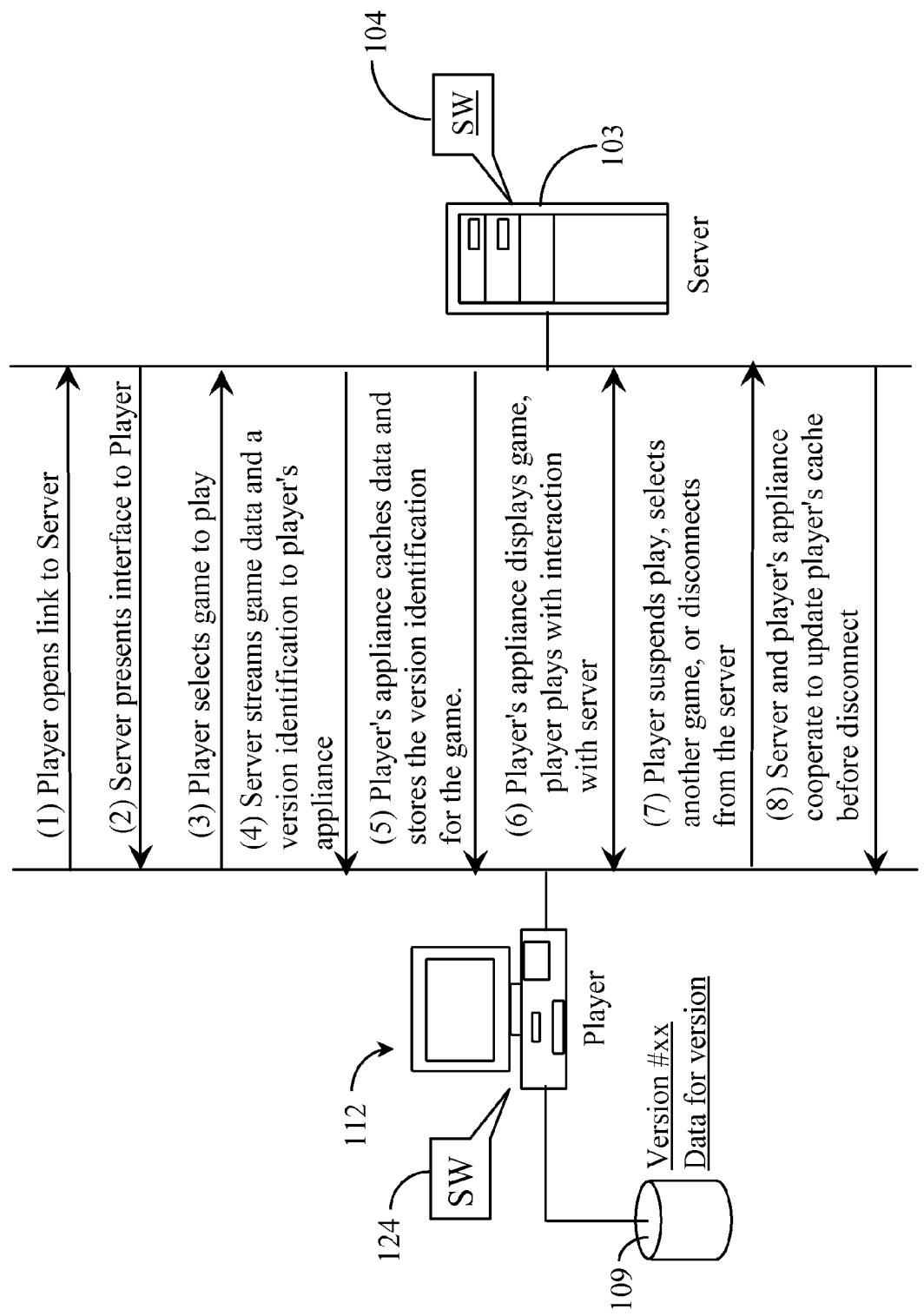
FIG. 2 is a diagram illustrating a series of communications between a player's appliance and a server in one embodiment of the present invention.

FIG. 2 illustrates a series of communication events, and results of those events, that may take place between a player using apparatus 112 and server 103 in the Internet, the server providing the data and any necessary executable code for rendering and managing a game accessible through the server. FIG. 2 represents a series of communication events that may take place the first time the client has selected a particular game to play.

In FIG. 2 appliance 112 is used as an example, but the player may be using any Internet-connectable device that is appropriate for playing a game served by server 103. Server 103 represents all of the interconnected apparatus in the network that may be accessed and used by server 103 in providing a player with ability to play a game.

At step (1) a player opens a link to server 103. At step (2) the server, executing SW code 104, presents an interactive interface to the player, through which the player may log in, browse available games, and select a game to play. At step (3) the player selects a game to play. At step (4) the server streams game data to the player. Since this is the first time the player has selected this particular game to play, all of the necessary data and any other resource the player will need must be transmitted. This may be a direct or an indirect transmission.

According to an embodiment of the invention the player's device has been configured to execute SW 124 to cache the data in a data storage device, and additionally to store a version identification, or some other version identification. The data storage device may be an internal hard drive, an external drive, or some other persistent memory such that the data may be accessible after the player's appliance may be powered down, and then powered up again. During play the data may be transferred to random access memory for quick access.

The configuration of the player's appliance may take place at any one of several different times. The player's appliance may be configured, for example, at the time that the player becomes a registered client of the game service. The configuration might happen at any other time that the player selects a game to play. For example, the player may have selected other games at different times, and the device might have been configured at any one of these times. Finally, the player's device may be configured to cache game data and to store a version identification, such as a number, at the time of the interaction illustrated in FIG. 2.

The version identification is assigned and maintained because the game data is not static over time. Static data for a game may not be maintained over a long period of time in exactly the form that it was originally created and offered to players. At different times engineers at the server side in the service of the game provider may add or subtract objects or landscape artifacts in the game. Some games allow players to make changes in a game, such as adding buildings and artifacts and changing the landscape in various ways.

In embodiments of the present invention a game is assigned a version identification, and each time the data defining the game changes, the version identification is updated. The server, which has all the defining data, also has the version identification. Each time the data, or a portion of the data, for that version is streamed to a player's device, the version identification is sent as well. By this mechanism, the player's device always "knows" the version identification of the cached data for the associated game.

Further to the above, each time the defining data for a game changes, and the version identification is updated, the server software compares the data for the older version with the new, and stores the data difference, which may be termed "delta" data.

Returning now to FIG. 2, at step (5) the player's device caches the data streamed from the server and stores the version identification in storage device 109. At step (6) the player's appliance displays the game on a monitor associated with the device, and the player may play the game with interaction with the server. It is important to note that, regarding step (6), in some games the player may be actively changing the static data, that is the virtual world, for the game during play.

At step (7) the player suspends play, and may select another game to play or disconnect from the server. In those instances that the player has altered the virtual world during the game session, the data at the server will now be different than the cached data at the player's appliance. The server at this point needs to assign a new version identification because the virtual world for the game is different. At step (8) the server updates the cache at the player's appliance with the changes, if any, that have been made during the game session and provides a new version identification.

In the event that the player selects a different game to play, the interactivity follows that described above with reference to FIG. 2 if the new game selected is a game selected for the first time. If the new game selected has been selected and played before, interactivity follows FIG. 3 described below. If the player does not select another game to play, but disconnects, it is expected that the player will reconnect at a future time and select a game to play. If the game is such that the player cannot change the virtual world, then this step is moot.

Figure 3:
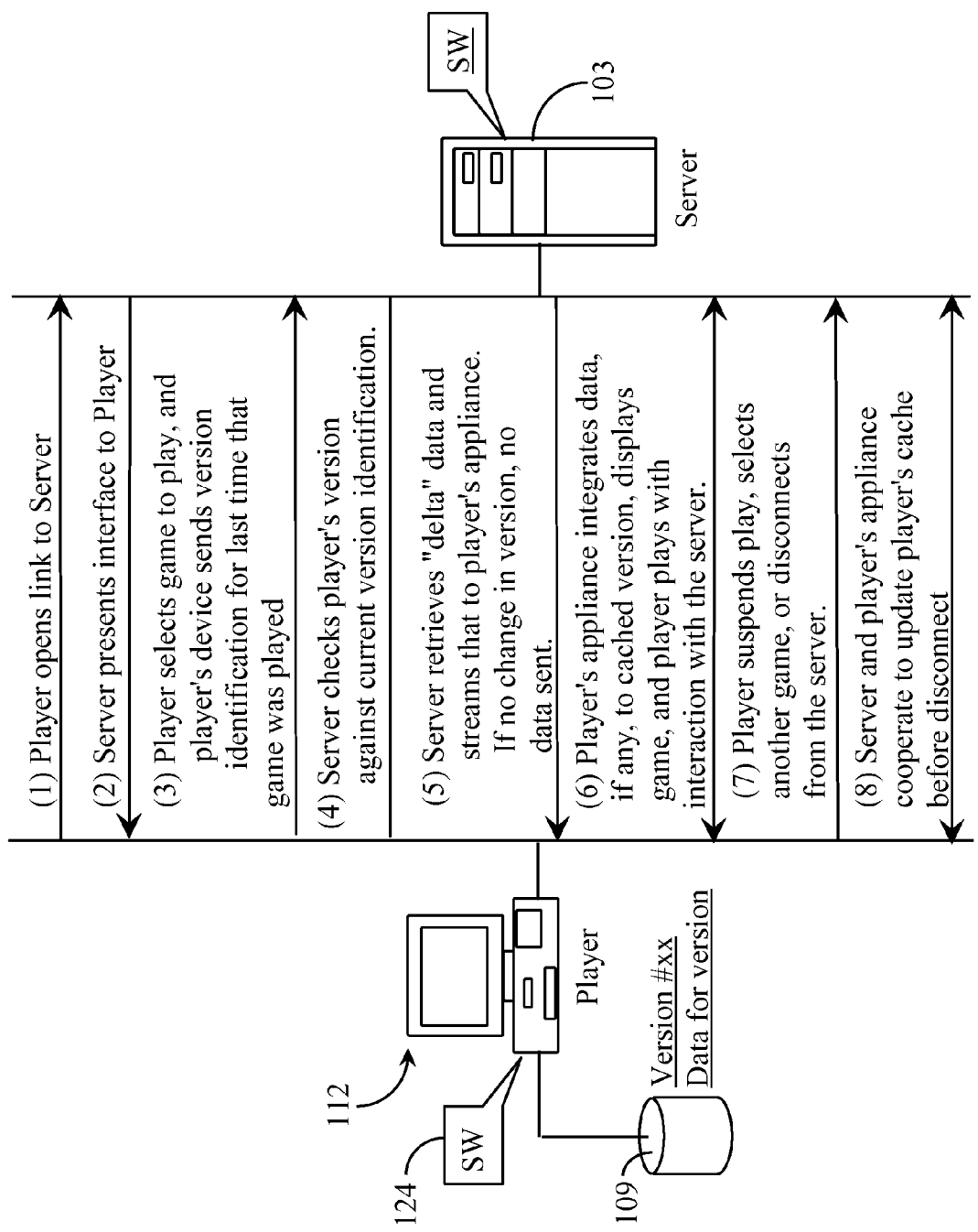
FIG. 3 is a diagram depicting a series of communications between a player's appliance and a server in another embodiment of the invention.

FIG. 3 illustrates steps in interaction between a player's device and the server in a situation wherein the player using the device has played the selected game before, and the player's device has been configured to cache according to an embodiment of the present invention. In this situation at step (1) the player opens a link to the server, and at Step (2) the server presents an interactive interface to the player. At step (3) the player selects a game to play, and the player's device sends the version identification stored for the last time the player played that game. This version identification represents the data in the player's cache for the particular game selected. The player's cache may have data and version identifications associated with a plurality of games.

At step (4) the server checks the version identification received from the player's device with the version identification of the same game as it is currently stored on the server side. If the version identifications are the same, it is known that the player already has the data necessary to play the game, and the server need not send any data. The player's device will be authorized to proceed with the data currently in cache. If the player's device has no version identification to send, indicating that this is a first time selection, interactivity will follow that described with reference to FIG. 2.

If the version identification sent by the player's device at step (3) differs from the current version identification at the server, the server determines the delta data, and retrieves and sends the delta data at step (5). In the event the version identifications differ by more than one integer, the server will determine the correct delta to send. It is important to understand that the delta may not simply be additional data. Data may have been added from an older version, but data may well have been subtracted as well. A function on the server side is to determine the difference, and the action necessary to update the player's version with the least data transmission.

At step (6) the player's appliance incorporates the delta data, if any, into the cached data and updates the version identification. The player's appliance then displays the game, and the player plays with interaction with the server. At step (7) the player suspends play, selects another game, or disconnects from the server. At step (8) the server updates the cache at the player's appliance with the changes, if any, that have been made during the game session and provides a new version identification.

In embodiments of the invention considerable time is saved, as well as cost for data transfer, by reducing the amount of data that must be sent to a player's appliance to a bare minimum. For a first time play all the data and necessary resources are sent. As long as the version identification does not change, the same player may play that game immediately at any time, because all of the necessary resources are stored at the player's computer. If the version identification changes, only that data that is different than a previous version has to be sent.

It will be apparent to the skilled person that the embodiments of the invention described above are exemplary and representative of many other arrangements that are also enabled by the descriptions provided. There may be differences in the order of the steps in caching and updating data in a player's appliance. There may be variations in the way and the times that a player's appliance may be configured to operate properly with the server side to accomplish the invention in different embodiments. There are many other possible variations, and the invention is limited only by the scope of the claims.

The invention claimed is:

1. A method, comprising:
opening a link between a player's appliance having a local cache and a remote network-connected server providing games;
selecting a game to play by the player through an interface provided to the player's appliance by the server;
accessing first data for the game selected stored in the local cache along with a first version identification for the first data, providing the first version identification to the server;
comparing by the server a second version identification for second data stored at the server, for the game selected, and the first version identification;
determining by the server a difference between the first and second version identifications and the amount of difference in data between the first data and the second data, the amount of difference creating third data;
transmitting by the server to the player's appliance, along with a new version identification, just the third data;
storing the third data and the new version identification in the local cache at the player's appliance;
playing the game by the player using the player's appliance utilizing at least the first and third data.

2. The method of claim 1 further comprising:
updating the local cache and version identification for any changes made to the virtual world data during play at the point that play is suspended.

3. The method of claim 1 further comprising:
determining by the server at the time a game is selected whether the game is being selected for a first time by the player;
determining by the server at the time the game is selected whether the game is a game for which the virtual world is always static; and
transmitting a file to the player's appliance, the file comprising all of the virtual world data for the game.

4. The method of claim 3 further comprising:
transmitting the file by an indirect path through a third-party provider.

5. The method of claim 3 further comprising:
redirecting the player's appliance to a third-party provider for download of data for the game selected.

6. An apparatus, comprising:
a network-connected server providing games;
software executing on a processor at the server from a non-transitory medium, the software providing:
  opening a link between the server and a player's network-connected appliance;
  configuring the player's appliance to operate with a local cache for storing virtual world data and a version identification for the data;
  selecting a game to play by the player through an interface provided to the player's appliance by the server;
  accessing first data for the game selected stored in the local cache along with a first version identification, providing the first version identification to the server;
comparing by the server if a second version identification stored at the server, associated with second data, is different than the first version identification provided to the server;
  determining by the server a difference between the first and second data, thereby creating third data;
  transmitting by the server to the player's appliance, along with a new version identification, just the third data;
  storing the third data and the new version identification in the local cache at the player's appliance;
  playing the game by the player using the player's appliance and at least the first and third data; and
  suspending play of the game by the player.

7. The apparatus of claim 6 further comprising:
updating the local cache and version identification for any changes made to the virtual world data during play at the point that play is suspended.

8. The apparatus of claim 6 further comprising:
determining by the server at the time a game is selected whether the game is being selected for a first time by the player;
determining by the server at the time the game is selected whether the game is a game for which the virtual world is always static; and
transmitting a file to the player's appliance, the file comprising all of the virtual world data for the game.

9. The apparatus of claim 8 further comprising:
transmitting the file by an indirect path through a third-party provider.

10. The apparatus of claim 8 further comprising:
redirecting the player's appliance to a third-party provider for download of data for the game selected.

* * * * *